United States Patent [19]

Hazenbroek

[11] Patent Number: 5,001,812
[45] Date of Patent: Mar. 26, 1991

[54] REVOLVING POULTRY THIGH DEBONER

[76] Inventor: Jacobus E. Hazenbroek, Burg de Zeeuwstraat 52, Numansdorp, Netherlands

[21] Appl. No.: 472,893

[22] Filed: Jan. 31, 1990

Related U.S. Application Data

[63] Continuation-in-part of Ser. No. 331,968, Apr. 3, 1989, abandoned, which is a continuation-in-part of Ser. No. 264,890, Oct. 31, 1988, Pat. No. 4,893,378.

[51] Int. Cl.$^5$ .............................................. A22C 25/16
[52] U.S. Cl. .................................... 452/135; 452/149; 452/71
[58] Field of Search ............................ 17/11, 1 G, 46

[56] References Cited

U.S. PATENT DOCUMENTS

| | | |
|---|---|---|
| 2,897,536 | 8/1959 | Bergstrom et al. . |
| 3,261,054 | 7/1966 | Kaplan et al. . |
| 3,296,653 | 1/1967 | Segur . |
| 3,348,261 | 10/1967 | Segur . |
| 3,402,423 | 9/1968 | Helgeson et al. . |
| 3,456,284 | 7/1969 | Werner et al. . |
| 3,533,128 | 10/1970 | Brown et al. . |
| 3,581,337 | 6/1971 | Tonjum et al. ........................ 17/46 |
| 3,672,000 | 6/1972 | Martin et al. . |
| 3,866,271 | 2/1975 | McNeil . |
| 4,041,572 | 8/1977 | Martin et al. ........................... 17/11 |
| 4,068,350 | 1/1978 | vanAppledorn . |
| 4,327,463 | 5/1982 | Martin .................................... 17/11 |
| 4,377,884 | 3/1983 | Viscozosi ............................... 17/11 |
| 4,639,974 | 2/1987 | Olson ..................................... 17/46 |
| 4,843,682 | 7/1989 | Bowen ................................... 17/11 |

*Primary Examiner*—Willis Little
*Attorney, Agent, or Firm*—Thomas & Kerr

[57] ABSTRACT

The deboner carries a plurality of modules in a closed path through a series of processing stations. Each module includes a rotary bone holder that supports one end of a poultry bone and a stripper assembly that is moved toward and away from the bone holder. The stripper blades engage the poultry part and stretch the meat, skin, etc., holding it taut while the thigh is moved through a cutting station. The stripper assembly is then moved away from the bone holder and then upwardly again to engage the bone and to strip the meat from the bone. As the blades strip the meat from the bone, the rotary bone holder is rotated by its sprocket engaging the sprocket turning protrusions.

12 Claims, 7 Drawing Sheets fig. 1 fig. 3 fig. 2 fig. 4 fig. 5 fig. 6 fig. 7 fig. 8 fig. 9 fig. 10 fig. 11 fig. 12 fig. 13

REVOLVING POULTRY THIGH DEBONER

CROSS REFERENCE TO RELATED APPLICATION

This application is a continuation-in-part of co-pending U.S. Pat. application Ser. No. 331,968, filed Apr. 3, 1989, now abandoned; which is a continuation-in-part of U.S. Pat. application Ser. No. 264,890, filed Oct. 31, 1988, now U.S. Pat. No. 4,893,378.

FIELD OF THE INVENTION

This invention generally relates to a process and apparatus for removing meat from bones of fowl and animals, and in particular relates to a process and apparatus for deboning poultry thighs by moving the bone of the thigh longitudinally with respect to the meat and stripping the meat from the bone.

BACKGROUND OF THE INVENTION

When removing the meat of the poultry thigh from its bone, the usual procedure is to strip the meat from the bone by scraping with a tool along the length of the bone. For example, two or more blades having notches therein are moved into contact with the meat and the bone with the notches of the blades straddling the bone, and the bone is then pulled through the notched blades. This longitudinal movement of the bone with respect to the blades causes the blades to scrape the meat along the length of the bone and finally off the end of the bone. Usually, the meat remains in a single mass after the meat has been stripped from the bone. Examples of this stripping type of meat removal from a bone are found in U.S. Pat. Nos. 3,672,000; 4,327,463; and 4,495,675.

One advantage of removing the bone from the meat of an edible fowl is that when the meat is later cooked, the bone does not have to be cooked, which saves energy. Further, if the bone is separated before the cooking process, the bone can be conveniently saved and used as bone meal, etc.

A problem with some of the prior art poultry deboning equipment is that the blades that engage the bone and strip the meat from the bone sometimes inadvertently cause bone fragments to be carried away from the bone in the meat.

Another problem with some of the prior art automated deboning equipment has been that the equipment must be manually loaded by placing the poultry thighs in the equipment and permitting the equipment to perform its deboning function while the worker waits for the deboning cycle to be completed. The hand/eye coordination of the worker must be timed with the operation of the equipment so that the worker does not have the flexibility to work slightly faster or slower during each cycle of operation of equipment.

SUMMARY OF THE INVENTION

Briefly described, the present invention comprises a deboning process and apparatus that comprises a plurality of deboning modules mounted on a revolving support system whereby poultry thighs and similar bone and muscle parts can be placed in sequence in modules of the apparatus at a worker's station, and as the apparatus revolves meat cutting and stripping functions are performed sequentially on each thigh.

Each module of the apparatus includes a rotary bone holder which carries the thigh bone with the module and the rotary bone holder rotates the bone about its own longitudinal axis. A pair of notched stripping blades engage the bone close to the holder and move downward slightly to stretch the meat. The poultry part is then moved through cutting means as the bone is rotated. The stripping blades then move upwardly to engage the bone above the cut and move along the length of the bone as the bone is rotated so as to strip the meat from the bone. As the meat is being stripped from the bone a twisting action is imparted with respect to the meat and the bone. This bone twisting action tends to enhance the meat removal function of the system.

Therefore, it is an object of this invention to provide an improved meat deboning system and apparatus whereby poultry thighs and similar meat and bone animal/fowl products can be expediently and reliably deboned.

Another object of this invention is to provide a system and apparatus for deboning poultry thighs and the like which utilizes a revolving arrangement of modules each of which carries a poultry thigh through a series of processing stations as the thigh is deboned.

Another object of this invention is to provide an improved process and apparatus for deboning poultry thighs and the like which functions to rotate the bone with respect to the meat as the meat is stripped from the bone.

Other objects, features and advantages of the present invention will become apparent upon reading the following specification, when taken in conjunction with the accompanying drawings.

DETAILED DESCRIPTION

Figure 1:
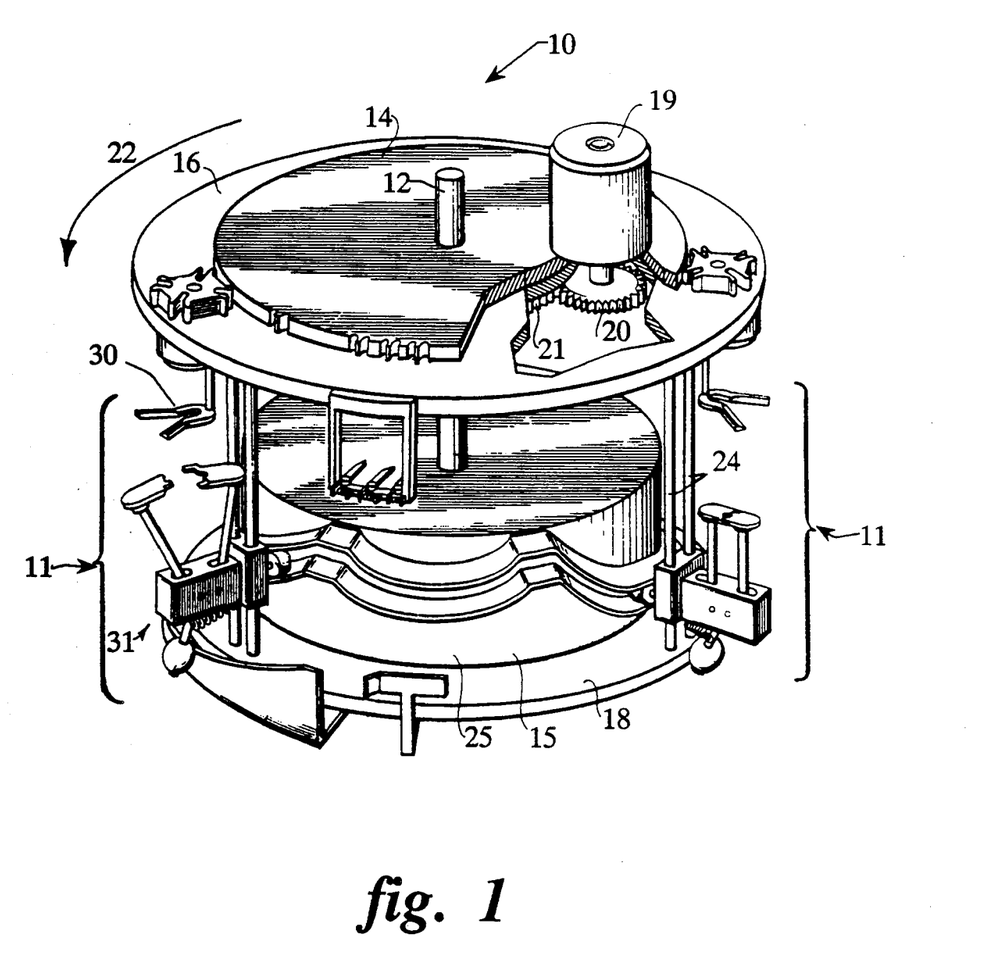
FIG. 1 is a perspective illustration of a first embodiment of the revolving deboner, showing only two modules mounted thereon for clarity.

Referring now in more detail to the drawings, in which like numerals indicate like parts throughout the several views, FIG. 1 illustrates the revolving poultry thigh deboner 10 in perspective, with only two deboning modules illustrated on the apparatus, with the other deboning modules and the cutting means being removed for clarity. It will be understood that a plurality of deboning modules 11 are positioned at equally spaced positions about the perimeter of the revolving poultry thigh deboner 10, and a plurality of work stations are also positioned about the revolving poultry thigh deboner. The work stations are not illustrated in FIG. 1 for clarity.

The thigh deboner 10 includes an upright stationary support shaft 12, with an upper platform 14 and cam drum 15 being rigidly mounted to the support shaft. Upper and lower rotary platforms 16 and 18 are mounted on bearings (not shown) to vertical support shaft 12. A motor 19 is mounted on upper stationary platform 14 and its driving sprocket 20 protrudes down through upper stationary platform 14 into driving engagement with the driven gear 21 which is rigidly mounted to upper rotary platform 16. This causes upper rotary platform 16 to rotate in the direction indicated by arrow 22.

Upper and lower rotary platforms 16 and 18 are connected together by a plurality of pairs of vertical guide bars 24.

The connection of the upper and lower rotary platforms 16 and 18 by the pairs of vertical guide bars 24 causes the lower rotary platform to rotate in unison with the upper rotary platform.

Cam drum 15 has a cylindrical outer wall 25, and a spiral cam track 26 with depressed portions 226 formed on the cylindrical outer wall.

Each deboning module 11 includes a rotary bone holder 30 which is supported by upper rotary platform 16 and a stripper assembly 31 which is mounted for vertical movement on a pair of vertical guide bars 24.

Figure 2:
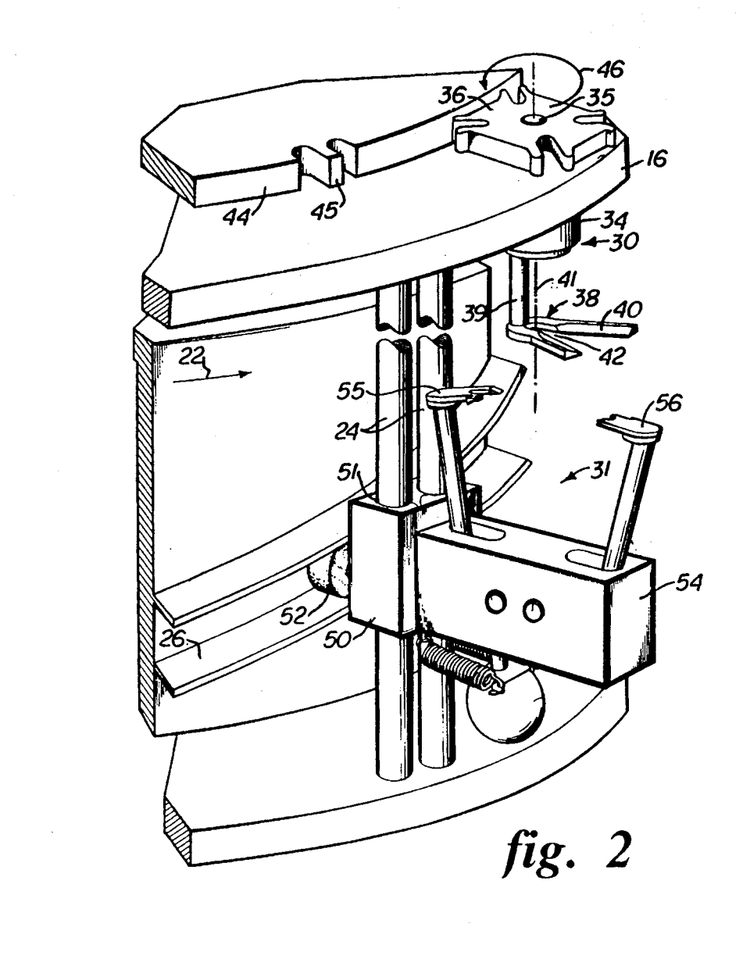
FIG. 2 illustrates one of the modules of the deboner.

As illustrated in FIG. 2, the rotary bone holder 30 comprises cylindrical support block 34 mounted just below upper rotary platform 16, vertical axle 35 that is rigidly mounted at its lower end to the support block 34 and which extends upwardly through an opening (not shown) in the upper rotary platform 16, turning sprocket 36 mounted to the upper end of the vertical axle 35, and bone carrier 38 mounted to the lower portion of cylindrical support block 34. Bone carrier 38 includes an upright stem 39 and a bifurcated, approximately U-shaped bone receiving yoke 40. Stem 39 is laterally off-set from the vertical axis 41 of vertical axle 35, so that the vertical axis passes through the gap 42 of the yoke 40.

The perimeter 44 of the upper stationary platform 14 is circular, and a plurality of sprocket turning protrusions 45 are mounted to the perimeter 44. The protrusions 45 are engaged by the turning sprockets 36 of each rotary bone holder 30 as the deboning modules 11 revolve about thigh deboner 10 in the direction as indicated by arrow 22. When a turning sprocket 36 moves into engagement with a sprocket turning protrusion 45, the protrusion causes the turning sprocket to rotate 90°. This results in the entire rotary bone holder 30 rotating 90°, as indicated by arrow 46.

As illustrated in FIG. 2, each stripper assembly 31 is carried by a pair of vertical guide bars 24 and comprises a carrier block 50 that has a pair of vertical guide bars 24. A cam roller 52 is rotatably mounted to carrier block 50 and is received in spiral cam track 26 of cam drum 25. Thus, as the stripper assembly 31 revolves about the cam drum 25, the cam roller 52 follows the cam track 26 to raise and lower the stripper assembly.

Figure 3:
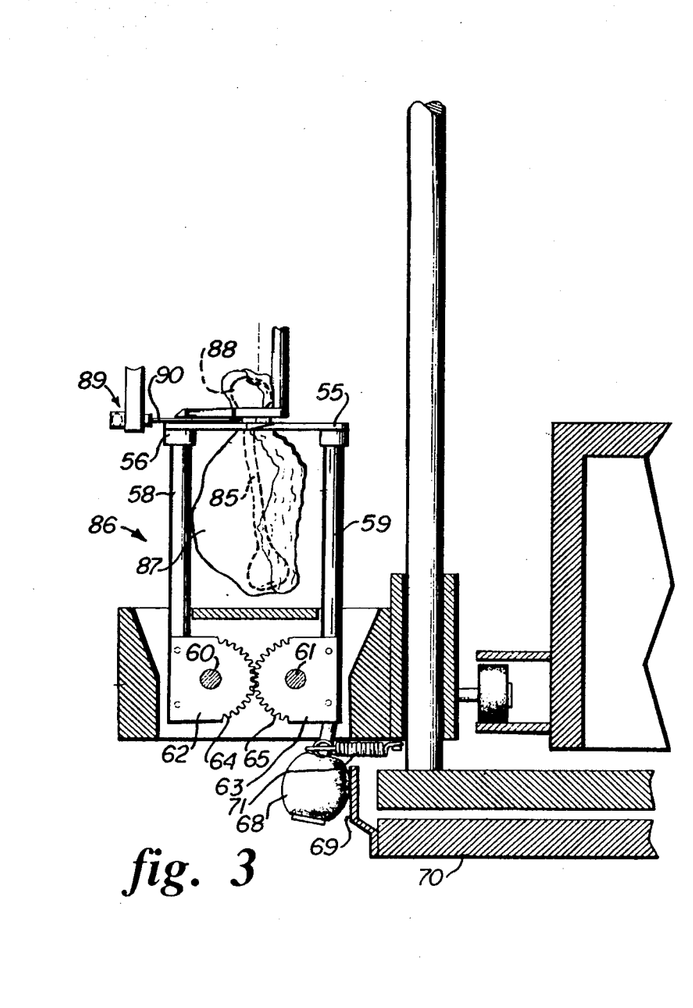
FIG. 3 illustrates the rotary bone holder having a poultry thigh mounted therein, with the rotary bone holder mounted above the stripper assembly, with the stripper block being shown in cross section.

As illustrated in FIGS. 2 and 3, stripper block 54 is rigidly mounted to and carried by carrier block 50, and stripper block 54. Blade support arms 58 and 59 each are rigidly mounted at their upper ends to a stripper blade 55 or 56, and each blade support arm is mounted to a half gear 62, 63 and each half gear is pivoted about a pivot pin 60, 61, with the pivot pins 60, 61 being mounted interiorally of stripper block 54. The half gears 62, 63 have teeth 64, 65 which engage the opposite half gear 62, 63. With this arrangement when a stripper blade 55 or 56 pivots away from the opposite stripper blade about its horizontal axle 60 or 61, its half gear 62 or 63 will tilt the opposite half gears and its stripper blade in the opposite direction. Likewise, when a stripper blade moves back toward engagement with the opposite stripper blade, the gear quadrants cause corresponding movement of the opposing stripper blade.

As illustrated in FIG. 3, cam follower 68 is mounted to the lower protruding portion of stripper blade support arm 59. A cam surface 69 is mounted to a stationary support 70, and cam follower 68 engages the cam surface 69 as the stripper assembly 31 revolves about the thigh deboner.

Stripper block 54 is interiorally shaped so as to receive blade support arms 58 and 59, horizontal axles 60 and 61 and half gears 62 and 63, with enough space being formed within the stripper block to accommodate the tilting movements of the internal elements. A spring, such as coil tension spring 71, is connected at its ends to carrier block 50 and lower end of blade support arm 59 to urge the stripper blades 55 and 56 toward engagement with each other.

Figure 5:
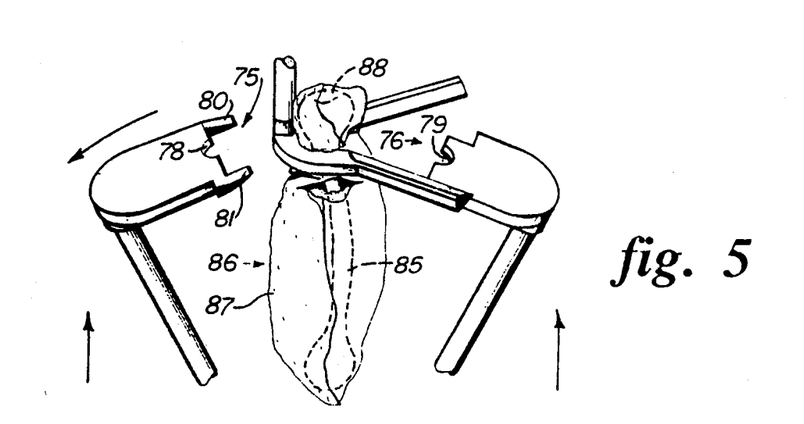
FIG. 5 is a perspective illustration of the rotary bone holder and the stripper blades showing how the stripper blades move apart as they move up for re-engagement with the poultry thigh.
Figure 6:
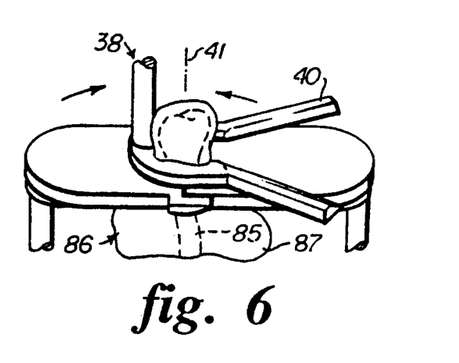

As illustrated in FIGS. 2 and 5, the stripper blades 55 and 56 have complementary shaped facing edges 75 and 76. Stripper blade 55 includes a central half opening or recess 78 while stripper blade 56 includes a similar half opening or recess 79 which, when moved together, form a circular opening. Outer protrusions 80 and 81 of stripper blade 55 fit about inner protrusions 82 and 83 of stripper blade 56 when the blades move together. This tends to lock the blades in a precise fit when they move together about a bone 85 of a poultry thigh 86 (FIG. 6), with the blades 55 and 56 being locked together above most of the meat 87 of the poultry thigh.

Figure 4:
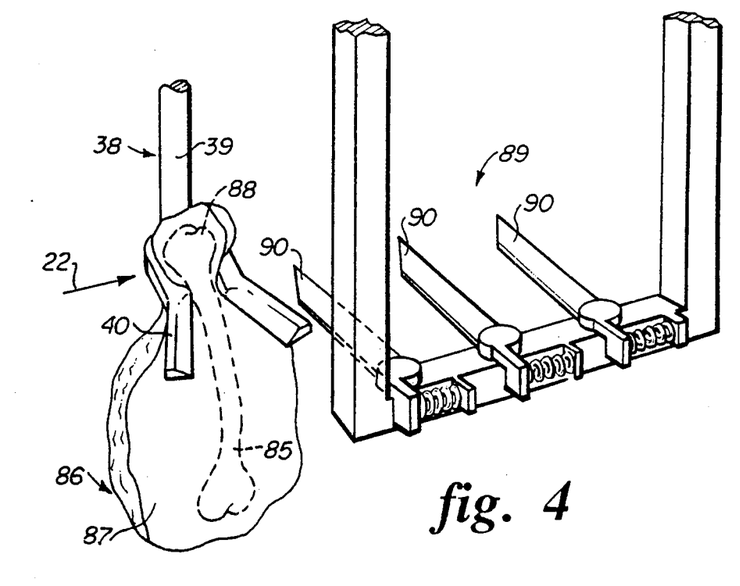
FIG. 4 is a perspective illustration of the rotary bone holder and a poultry thigh mounted therein as the meat of the poultry thigh is stretched and carried through the cutting station.

As illustrated in FIG. 4, a cutting station 89 is positioned in the path of travel of the bone carrier 38 as the bone carrier moves a thigh 86 in the direction as indicated by arrow 22. Cutting station 89 includes a plurality of cutting blades 90 that are spring urged toward the path of the poultry thigh 86. As illustrated sequentially in FIGS. 3 through 6, the thigh 86 or other part is engaged in the bone carrier 38. The separated arms 58 and 59 of the stripper assembly are moved upwardly to a point just below the yoke, whereupon the arms close and the stripper blades 55 and 56 engage the thigh. Referring to FIG. 1, it can be seen that the cam track is angled downwardly at selected points corresponding to the point at which the stripper blades engage the thigh. As the cam roller follows the depression 226, the stripper blades move downwardly, stretching the meat, skin, etc. The thigh is then moved past the cutting means 90, being rotated as the sprocket 36 engages the protrusions 45.

Referring still to FIG. 1, it will be noted that the cam track then angles upwardly, thus raising the arms and stripper blades, while at the same time the blades are moved to an open position, this being shown in FIG. 5. The blades are then closed again in the vicinity of the cut (FIG. 6), and the meat is stripped from the bone as the cam roller follows the downwardly angled cam track, carrying the stripper assembly therewith.

Figure 12:
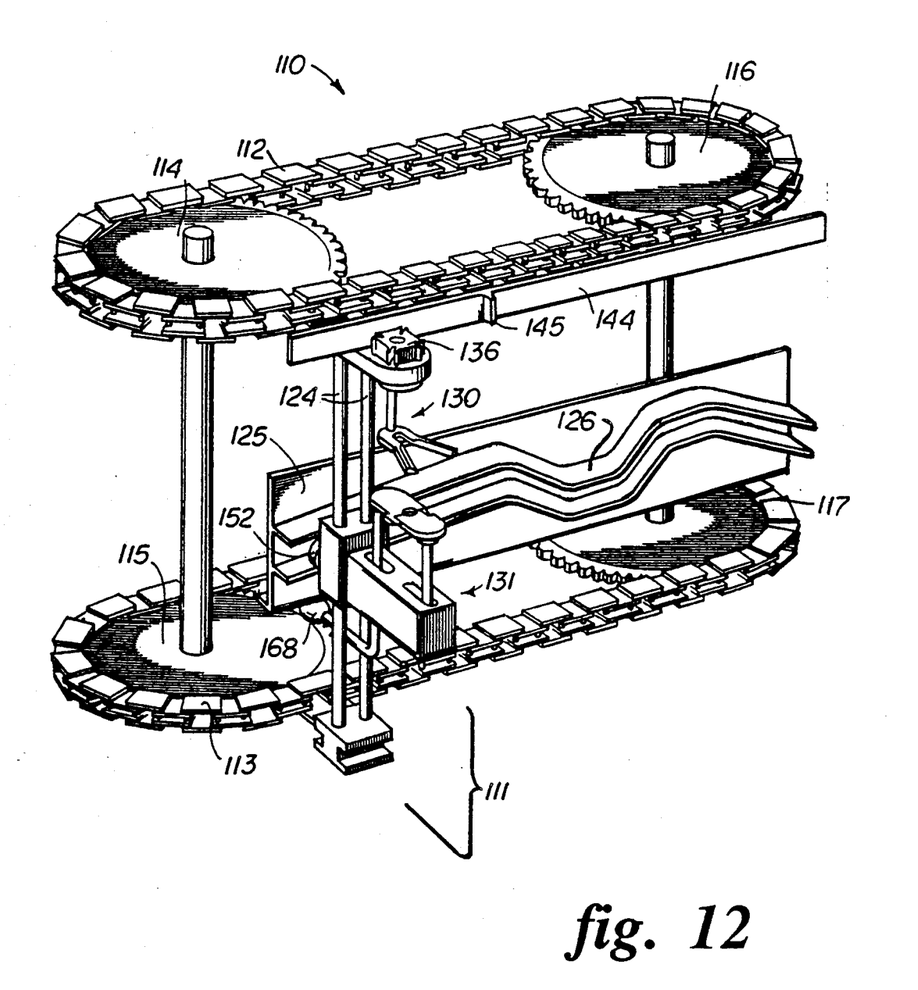
FIG. 12 is a perspective illustration of a second embodiment of the revolving deboner, showing only two modules.
Figure 13:
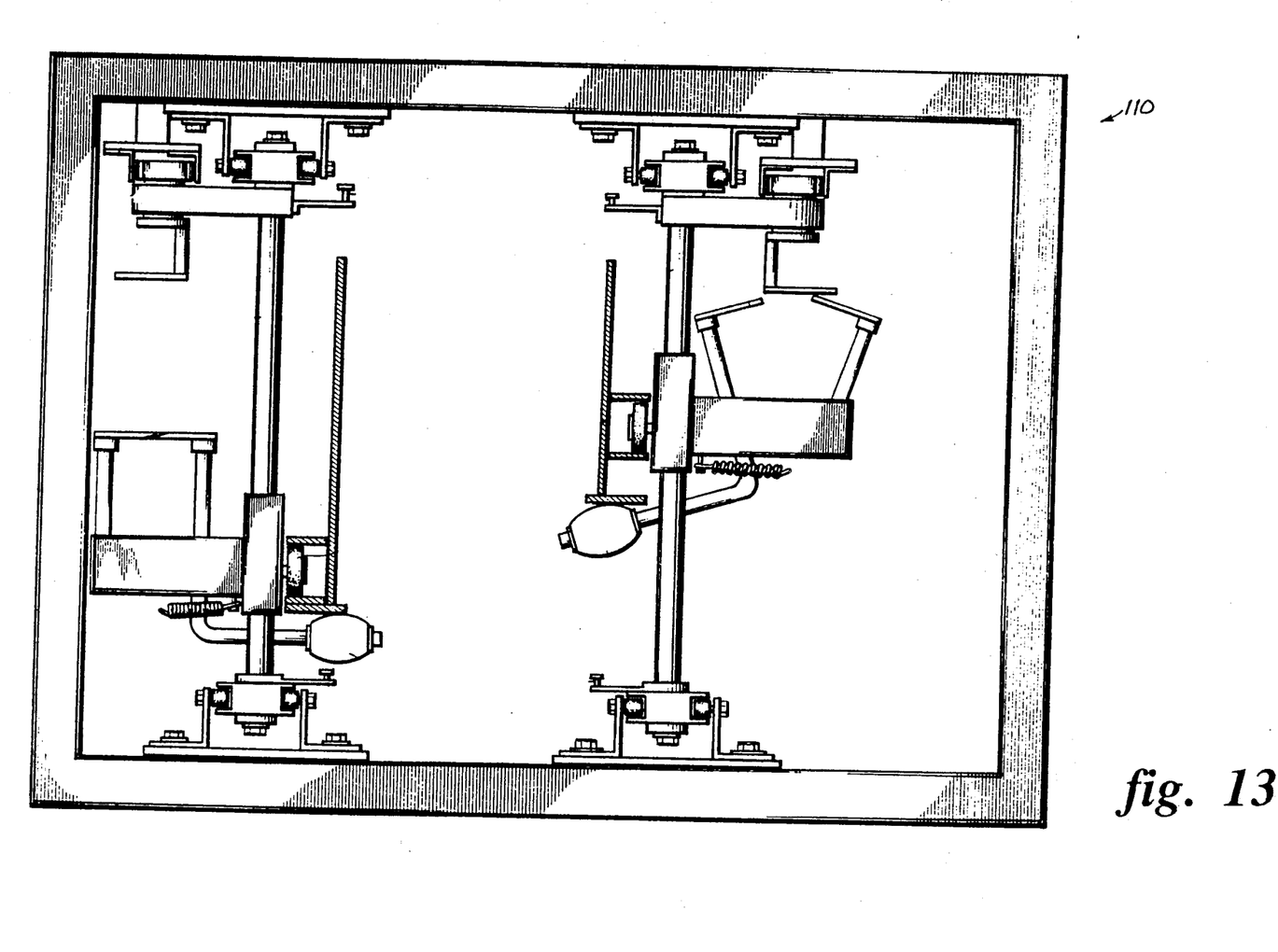
FIG. 13 is an end elevational view of a pair of modules of the second embodiment of the revolving deboner.

FIGS. 12 and 13 show a second embodiment of the invention. While FIGS. 1–11 disclose a carousel type revolving poultry thigh deboner, FIGS. 12 and 13 show a chain conveyor revolving deboner 110. The modules 111 are each mounted to upper and lower conveyor chains 112 and 113, with the conveyor chains extending about upper and lower sprockets 114 and 115 at one end of the system, and about upper and lower sprockets 116 and 117 at the other end of the system. One pair of the sprockets 114, 115 or 116, 117 is driven so as to move chains 112 and 113 about the sprockets in the direction as indicated by arroW 119. The pairs of vertical guide bars 124 of each module 111 are mounted at their tops and bottoms to links of the chains 112 and 113, and the rotary bone holder 130 of each module 111 is carried adjacent the upper chain 112. A cam track 126 is mounted to a support wall 125 that extends adjacent the path of travel of each module 111, so that the cam roller 152 of each module rides in the cam track 126, resulting in the cam track 126 raising and lowering each stripper assembly 131 in sequence as the module revolves about the deboner 110. Cam surfaces 169 are supported beneath cam track 126 on the support wall or other supporting structure so as to actuate the cam followers 168 of each module 111, so as to spread apart and bring together the stripper blades 155 and 156.

Turning sprockets 136 of each rotary bone holder 130 slidingly engage the outer surface of stationary guide 144, and when a sprocket 136 engages a sprocket turning protrusion 145 of the guide 144, the sprocket 136 and the remaining elements of the bone holder 130 turn 90 degrees, as previously described.

A plurality of work stations are located about the revolving deboner of FIG. 12 as generally disclosed for the embodiment of FIGS. 1 through 11.

In general, except for the fact that the modules 111 of the embodiment of FIG. 12 are carried by chains and revolve in an elongated closed path while the modules 11 of FIGS. 1 through 11 in a circular path, the principles of operation of the second embodiment of FIGS. 12 and 13, is substantially the same as those of FIGS. 1 through 11. Thus, further detailed description of FIGS. 12 and 13 is not believed to be necessary, except to note that the cam track 126 includes the depression 226 used for moving the stripper blades downwardly and stretching the meat, skin, etc., prior to moving the thigh past the cutting blades, whereupon the upward slope of the cam track returns the stripper assembly to its previous height to strip the bone.

OPERATION

When the revolving poultry thigh deboner 10 (FIG. 1) is in operation, its motor 19 causes the upper and lower rotary platforms 16 and 18 to rotate in the direction as indicated by arrow 22. A worker (not shown) retrieves poultry thighs from a supply and places each poultry thigh in a bone carrier 38 of a rotary bone holder 30 of each revolving deboning module 11, by inserting the upper portion of the bone into the gap 42 of the bone receiving yoke 40, with the yoke supporting the upper knuckle 88 (FIG. 3). Thus, each poultry thigh is firmly supported in and suspended beneath the bone carrier 38 (FIG. 1).

As the poultry thigh deboner 10 revolves about its centrally positioned vertical support shaft 12, each poultry thigh 86 is moved toward the cutting station 89 where the thigh is grasped by the stripper blades. As illustrated in FIG. 3 the stripper blades then move slightly downwardly to stretch the meat adjacent the yoke as the cam roller follows the depressed portion of the cam track. The thigh is then moved through the cutting station (FIG. 4) where the cutting blades 90 engage and cut through the meat of each thigh adjacent the upper knuckle 88.

Stripper assembly 31 (FIG. 1) is then carried in an upward direction by its cam roller 52 following the upwardly sloped cam track 26, and as shown in FIG. 5, the stripper blades 55 and 56 move upwardly relative to the thigh 86, the blades are moved apart by the action of the cam follower 68 engaging the cam surface 69, so that the blades are spread apart from each other. When the stripper blades 55 and 56 have moved upwardly about the thigh and reach the level of just below bone carrier 38, the cam 69 allows the blades 55 and 56 to move back together under the influence of the tension spring 71, so that the stripper blades engage opposite sides of the poultry thigh 86 (FIG. 6), with the recesses 78 and 79 of the stripper blades surrounding the poultry bone 85. As discussed earlier, the cam roller 52 (FIG. 1) then follows the depressed portion 226, causing the stripper blades to stretch the meat and hold the meat taut while the thigh is moved through the cutting station. The cam roller then rides upwardly out of the depression, raising the stripper assembly and opening the stripper blades.

Second cam 72 is located in the path of the cam follower 68 and engages the cam follower 68 so as to urge the stripper blades back toward their closed positions, to assure that the stripper blades surround the upper end portion of the bone 85 of the poultry thigh 86 in the vicinity of the incisions made in the thigh.

Figure 7:
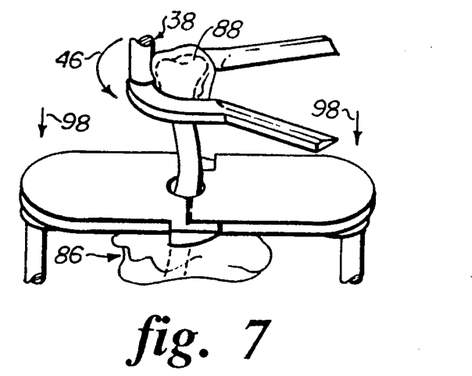
FIGS. 7-10 are perspective illustrations of the rotary bone holder and the stripper blades, showing the progressive movement of the stripper blades down the bone of the poultry thigh and how the meat is scraped from the thigh as the bone is rotated.
Figure 8:
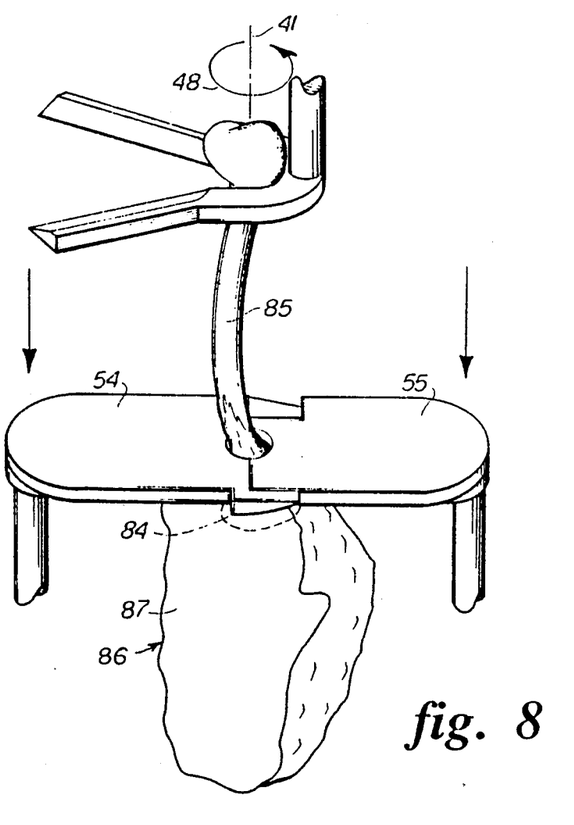

As the deboning module continues its movement about the cam drum 15, the rotary bone holder 30 engages a series of sprocket turning protrusions 45 (FIG. 2), so that the rotary bone holder 30 rotates about its upright turning axis 41 as indicated by arrow 46 (FIG. 7). In the meantime, stripper assembly 31 beings its downward movement under the influence of cam track 26 with the blades engaged about the thigh bone 85. As illustrated in FIGS. 5–8, the downward movement of the stripper blades 55 and 56 and the twisting of the thigh bone 85 about its longitudinal axis causes the meat 87 to be stripped from the bone 85 by pushing the meat along the length of the bone and rotating the bone with respect to the meat.

Figure 9:
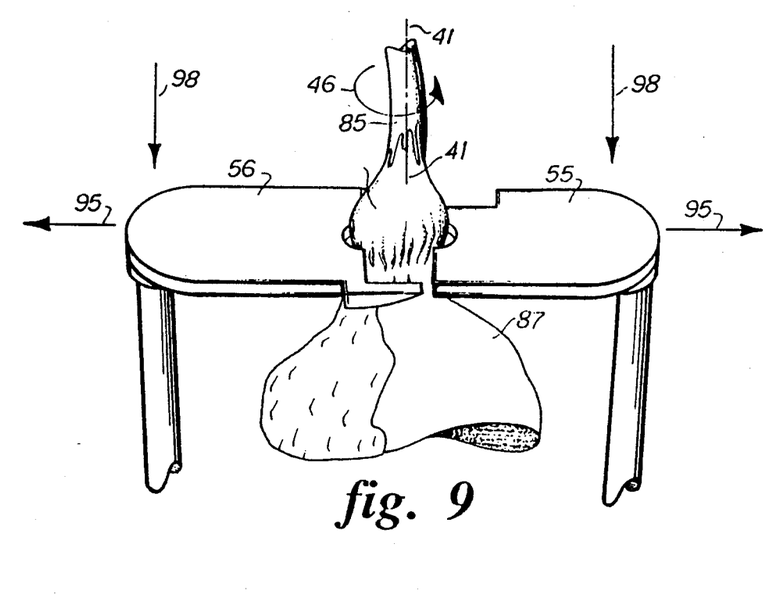
Figure 10:
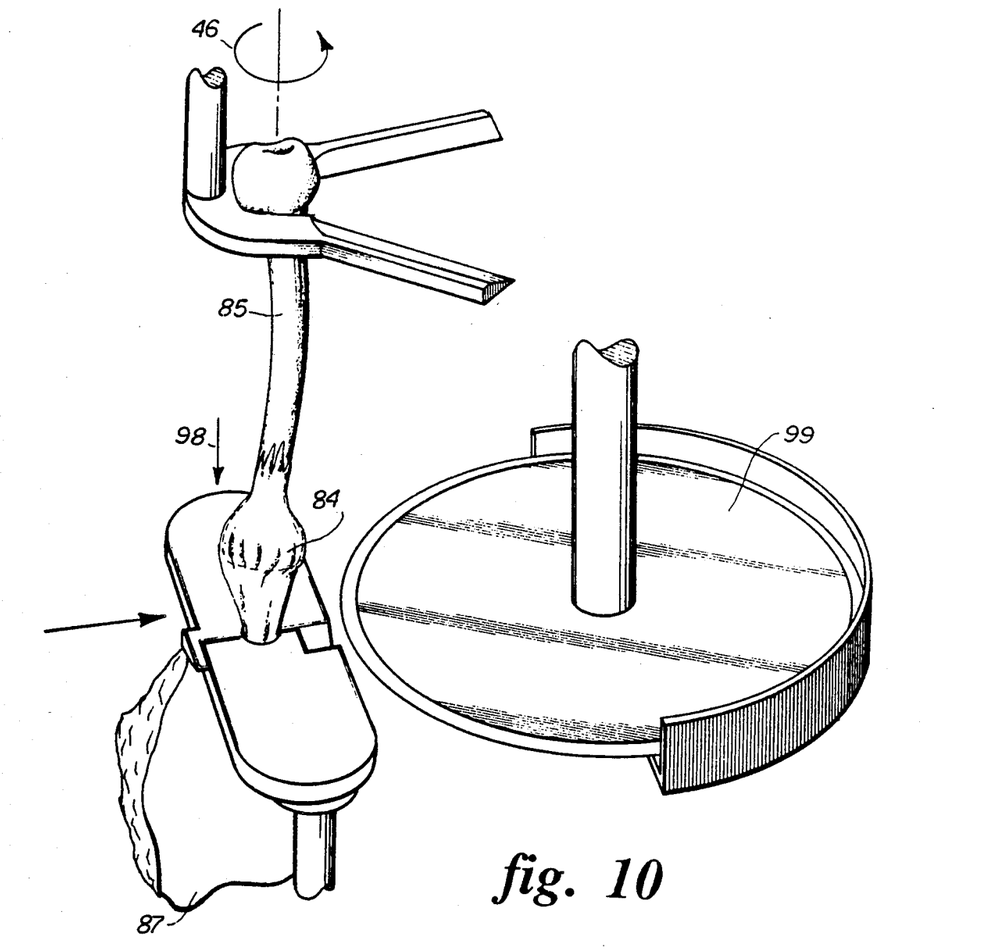
Figure 11:
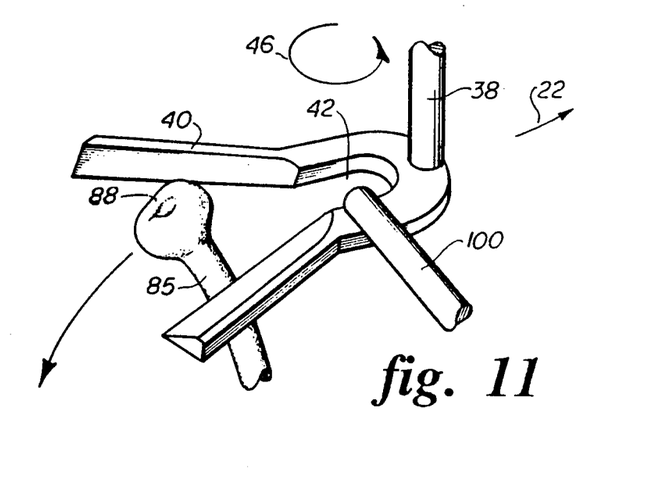
FIG. 11 is a perspective illustration of the rotary bone holder, showing how the stripped bone is removed from the holder.

As the stripper blades 55 and 56 engage the lower knuckle 84 which is a larger diameter than the intermediate portion of the thigh bone 85 (FIGS. 9, 10 and 11), the spring 71 (FIG. 3) permits the stripping blades 55 and 56 to move away from each other as indicated by arrows 95 and 96, and then back toward each other (FIG. 11) so that the downward movement of the stripping blades as indicated by arrows 98 is not impeded.

Once the stripping blades 55 and 56 have moved about the lower knuckle 84 of the thigh bone 85, the meat 87 of the thigh will have been substantially stripped from the thigh bone. A rotary disc cutting blade 99 is positioned in the path 22 of the poultry thigh at a level just beneath the lower knuckle 84 of the bone 85 and cuts any portion of the meat 87 that remains clinging to the bone 85. This completely separates the meat from the bone of the poultry thigh. The meat 87 is permitted to drop to an awaiting collector, such as a surface conveyor, where the meat is transported away from the revolving poultry thigh deboner.

When the meat has been separated from the bone (FIG. 10), the bone 85 remains in the bone carrier 38. The bone carrier is rotated (FIG. 11) so that its gap 42 faces away from its direction of revolution 22, and the bone carrier 38 passes adjacent a stationary bone engagement rod 100, with the distal end of the rod 100 extending in the path of the bone 85. This causes the bone 85 to be knocked out of the gap 42 of the bone receiving yoke 40. The bones 85 are collected and transported away from the revolving poultry thigh deboner.

The bones of poultry thighs are curved, and the thighs are supported with the axis of their bones 85 in a substantially upright attitude. The bones are each rotated about their length as the stripper blades 55 and 56 engage the poultry thigh and move down the length of the bone. This combined scraping and turning action about the bone tends to efficiently remove the meat from the bone even though the bone is curved.

The operation of the second embodiment of the invention is similar to the operation of the previously described first embodiment, in that the modules 111 revolve with the movement of chains 112 and 113 in an elongated closed path past a plurality of work stations and the bone of the thigh is rotated as the meat is removed from the bone. An advantage of the embodiment of the deboner disclosed in FIGS. 12 and 13 is that the equipment can be moved through smaller doorways of a poultry processing plant and down the aisles between other equipment so as to reach the location within the poultry processing plant where it is to be installed. Further, in some plant locations the space available for new equipment is sometimes long and narrow instead of equal dimensions as might be required for the deboner of FIGS. 1-11.

Although the invention has been disclosed as a system and apparatus for deboning poultry thighs, it will be understood that the invention will be useful in deboning other fowl and animal parts.

It will be understood that the foregoing relates only to a preferred embodiment of the present invention, and that numerous changes and modifications may be made therein without departing from the spirit and scope of the invention as set forth in the following claims.

I claim:

1. A method of deboning poultry thighs or the like comprising:
   grasping a thigh bone at the first of two knuckles in which the knuckles define an axis;
   engaging the thigh adjacent the first knuckle with meat stripper means;
   stretching the meat of the thigh with the meat stripper means;
   creating an incision in the meat of the thigh adjacent the first knuckle;
   releasing the thigh and re-grasping it with the meat stripper means in the vicinity of the incision; and
   moving the thigh bone and the meat stripper means with respect to each other along the length of the thigh bone until the meat stripper means passes over the second knuckle and separates the meat from the bone, and as the thigh bone moves relative to the meat stripper rotating the thigh bone about its axis with respect to the stripper means.

2. The method of claim 1 and wherein the step of stretching the meat of the thigh includes moving each meat stripper means longitudinally with respect to the bone and pulling the meat downwardly to tension the meat.

3. The method of claim 1 and wherein the step of creating an incision in the meat includes rotating each bone holder so as to rotate the bone with respect to the meat stripping means.

4. The method of claim 1 and wherein the step of grasping the thigh bone adjacent the first knuckle of the thigh bone comprises inserting the thigh bone into the opening of an approximately U-shaped thigh bone holder, and wherein the step of rotating the thigh bone comprises rotating the bone holder.

5. The method of claim 1 and wherein the step of engaging the thigh bone with meat stripper means comprises moving a pair of meat stripper blade members into engagement with the thigh on opposite sides of the thigh.

6. Apparatus for removing meat from an elongated bone of a poultry part or the like comprising:
   a support system;
   power means for revolving said support system;
   a plurality of deboning modules carried in series about said support system;
   said modules each including a bone carrier and meat stripper means;
   said bone carriers each including means for supporting the bone of the poultry part at one end of the bone and with the majority of the bone and meat protruding from the carrier;
   said meat stripper means each including a pair of stripper blades movable between open positions displaced from the poultry part and closed positions biased into engagement with opposite sides of the bone of the poultry part;
   means defining a first cam track extending circumferentially about said support system and having a cam profile;
   said cam profile having a first raised portion for moving said meat stripper means upwardly toward the end of the bone of the poultry part;
   first means for closing said stripper means biased into engagement with the meat on opposite sides of the bone;
   said cam profile having a depressed portion after said first raised portion for lowering said meat stripper means to create and maintain tension on the meat cutting means for creating an initial incision in the meat of the bone;
   means for causing said stripper means to disengage from the meat,
   said cam profile having a second raised profile to raise said meat stripper means toward the end of the bone of the poultry part, second means for closing said stripper means into engagement with the bone of the poultry part, and
   said cam profile having a second depressed portion after said second raised portion for lowering said meat stripper means to strip the meat from the bone.

7. An apparatus as defined in claim 6 in which said apparatus includes a plurality of spaced cutting means spaced from the point of engagement of said meat stripper means for cutting the meat from the bone.

8. An apparatus as defined in claim 7 in which said apparatus includes a rotatable sprocket operatively associated with said deboning modules for rotating said bones as they are moved around said support system.

9. A method of deboning poultry thighs of the like comprising the steps of:
grasping a thigh bone at a first knuckle;
engaging the thigh adjacent the first knuckle with meat stripper means;
moving said meat stripper means slightly downwardly for stretching the meat,
cutting the meat at a point near said first knuckle disengaging said meat stripper means,
moving said meat stripper means upwardly to reengage the thigh in the vicinity of the cutting point, and moving the thigh bone and the meat stripper means with respect to each other along the length of the thigh bone until the meat stripper means passes over the other knuckle of the thigh bone and separates the meat from the bone.

10. The method of claim 9 and wherein the step of stretching the meat of the thigh includes moving each meat stripper means longitudinally with respect to the bone and pulling the meat downwardly to tension the meat.

11. The method of claim 9 and wherein the step of cutting an incision in the meat includes rotating each bone holder so as to rotate the bone with respect to the meat stripping means.

12. The method of claim 9 and wherein the step of engaging the thigh bone with meat stripper means comprises moving a pair of meat stripper blade members into engagement with the thigh on opposite sides of the thigh.

* * * * *